(12) United States Patent
Brown

(10) Patent No.: US 6,843,049 B2
(45) Date of Patent: Jan. 18, 2005

(54) SYSTEMS AND METHODS FOR HARVESTING FRESH PRODUCE

(75) Inventor: Richard Brown, Salinas, CA (US)

(73) Assignee: Fresh Express, Inc., Salinas, CA (US)

( * ) Notice: Subject to any disclaimer, the term of this patent is extended or adjusted under 35 U.S.C. 154(b) by 69 days.

(21) Appl. No.: 10/284,052

(22) Filed: Oct. 29, 2002

(65) Prior Publication Data

US 2003/0126850 A1 Jul. 10, 2003

Related U.S. Application Data

(63) Continuation-in-part of application No. 09/507,503, filed on Feb. 18, 2000, now Pat. No. 6,467,248.

(51) Int. Cl.[7] .............................................. A01D 45/00
(52) U.S. Cl. ........................ 56/327.1; 134/25.3; 134/32
(58) Field of Search ........................... 56/327.1, 164 R, 56/16.5, 328.1; 121/14, 27, 127, 12; 460/144, 123, 99, 96, 131, 142, 146, 147; 137/25.3, 32, 131, 133

(56) References Cited

U.S. PATENT DOCUMENTS

| 3,821,987 | A | * | 7/1974 | Shepardson et al. | 171/61 |
| 4,294,063 | A | * | 10/1981 | Bianchi | 56/16.4 R |
| 5,316,778 | A | * | 5/1994 | Hougham | 426/324 |
| 6,298,644 | B1 | * | 10/2001 | Sandei | 56/327.1 |
| 6,298,865 | B1 | * | 10/2001 | Brown et al. | 134/25.3 |
| 6,463,722 | B1 | * | 10/2002 | de Groot | 56/12.9 |
| 6,626,192 | B2 | * | 9/2003 | Garcia et al. | 134/25.3 |
| 2003/0182920 | A1 | * | 10/2003 | Maconachy et al. | 56/327.1 |

* cited by examiner

Primary Examiner—Árpád F. Kovács

(57) ABSTRACT

Systems and methods for harvesting fresh produce using a produce harvesting apparatus wherein the method includes trimming the fresh produce and placing the trimmed produce into a container. The container is placed onto a transport device located on the produce harvesting apparatus. The container is then transported on the transport device to a wash station and it is washed at the wash station. The container may be shaken during transport after the wash station.

57 Claims, 6 Drawing Sheets

SYSTEMS AND METHODS FOR HARVESTING FRESH PRODUCE

CROSS-REFERENCES TO RELATED APPLICATIONS

This application is a continuation-in-part application and claims the benefit of application Ser. No. 09/507,503 filed Feb. 18, 2000 now U.S. Pat. No. 6,467,248, entitled "Method For Processing Freshly Harvested Leavy Vegetables And Subdivided, Peeled Fruit", which disclosure is incorporated herein by reference for all purposes.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

1. Field of the Invention

The present invention relates to systems and methods for harvesting fresh produce, and more particularly, to systems and methods using a harvesting apparatus for harvesting lettuce-type produce wherein the lettuce-type produce is trimmed and cored in the field.

2. Description of the Prior Art

The demand for leafy vegetables, such as, for example, lettuce, spinach, cabbage, baby leaves, baby lettuce, baby spinach, frisee, flowering kale, kale, cilantro, baby leaf vegetables, arugula, etc., has greatly increased over the years. Salads are now often in high demand for meals, whether as an entree, a side dish or an appetizer. Thus, lettuce is generally grown and harvested year-round in various parts of the United States. Furthermore, with the increased demand comes an increased need for efficiency in order to quickly and adequately meet the demand.

Many produce companies, especially salad producing companies, desire to produce high quality field-cored lettuce, especially romaine lettuce, for shipment to their regional salad plants. Coring the lettuce in the field eliminates most waste leaves and cores thereby reducing the bulkiness of the product during shipment. Generally, this means that only 100 percent usable lettuce leaves are shipped when the lettuce head is cored in the field.

It has been discovered by the present assignee that it is preferable to first cut and core the romaine lettuce heads and then allow them to bleed excess sap prior to washing. The sap, or latex exudate, generally requires from one to four minutes to adequately bleed, depending upon weather conditions, time of day, etc.

An initial attempt at providing a system and method for trimming and coring romaine lettuce while harvesting involved cutting and coring romaine lettuce and then placing the heads into a tray affixed to the harvesting apparatus. The tray included a wire bottom. A first tray is filled and then the packer begins filling a second tray that is also affixed to the harvesting apparatus. When the second tray is filled, the first tray is washed and then dumped by tipping the tray over onto a conveyor belt. The trimmer then starts refilling the first tray. Thus, a tray always is full and left to wait while another tray is being filled. This created a delay for the latex to exude from the romaine leaf veins. However, this arrangement is inefficient with regard to labor. Each tray is washed by the trimmer prior to dumping. This results in lost trimming time of approximately 16 percent.

SUMMARY OF THE INVENTION

The present invention provides a method of harvesting fresh produce using a produce harvesting apparatus wherein the method includes trimming the fresh produce and placing the trimmed produce into a container. The container is placed onto a transport device located on the produce harvesting apparatus. The container is then transported on the transport device to a wash station and it is washed at the wash station.

In accordance with one aspect of the present invention, the trimmed produce is transported on the transport device from the wash station to a transport container. The trimmed produce is transferred from the trimmed produce to the transport container.

In accordance with another aspect of the present invention, the transport device is shaken at least between the wash station and the transport container.

In accordance with a further aspect of the present invention, the transport device comprises a conveyor and the conveyor is shaken by clapper bars located under the conveyor that thereby bounce the conveyor.

In accordance with another aspect of the present invention, the transport device is shaken between where the container is placed thereon and the transport container.

In accordance with a further aspect of the present invention, the container is placed on a return transport located on the produce harvesting apparatus and transported thereon.

In accordance with yet another aspect of the present invention, the container comprises a tote with a wire mesh bottom.

In accordance with yet a further aspect of the present invention, the container comprises a plastic tote with a grid bottom that allows liquid to penetrate through the bottom of the tote after washing the trimmed produce.

In accordance with yet another aspect of the present invention, the container comprises a basket.

In accordance with a further aspect of the present invention, the container comprises a wire basket.

In accordance with yet another aspect of the present invention, the wash station comprises spray nozzles.

In accordance with yet a further aspect of the present invention, the trimmed produce is submerged at the wash position.

In accordance with another aspect of the present invention, the container includes a solid bottom.

In accordance with a further aspect of the present invention, the trimmed produce is washed by filling the container with liquid and then dumping or draining out the liquid.

The present invention also provides a portable produce harvesting system that includes at least one trim station for trimming produce, at least one container for receiving trimmed produce, at least one wash station for washing trimmed produce in the container, and at least one transport device coupling the trim station and the wash station.

In accordance with one aspect of the present invention, the system further comprises a load station after the wash station for receiving washed produce. The transport device extends between the trim station and the load station.

In accordance with another aspect of the present invention, the system includes structure for shaking the transport device at least between the wash station and the load station.

In accordance with another aspect of the present invention, the system includes a plurality of trim stations.

In accordance with a further aspect of the present invention, the system includes a plurality of containers.

Thus, the present invention provides systems and methods for harvesting produce, especially lettuce, such as romaine lettuce, wherein the produce is trimmed, which may include coring, in the field. Trimmed produce is placed within a container and then placed on a transport device for transport to a wash station. While the container is being filled, the sap is allowed to bleed from the trimmed produce. Additionally, sap further bleeds from the produce while it is being transported to the wash station. Additionally, a first container may be allowed to sit before being placed on the transport device, while a second container is filled. Once the second container is filled, the first container may be placed on the transport device and transported to the wash station. The delay time in allowing the first container to sit provides extra time for the sap to bleed from the trimmed produce.

Additionally, the transport device may extend between the wash station and a transport container and may be shaken to help shake excess water and any remaining sap from the trimmed produce. Additionally, the transport device may be shaken between the trim stations and the wash station in order to help remove sap bleeding from the trimmed produce.

The preferred exemplary embodiments of this invention will now be discussed in detail. These embodiments depict the novel and nonobvious systems and methods for harvesting fresh produce of this invention shown in the accompanying drawings, which are included for illustrative purposes only, with like numerals indicating like elements.

DETAILED DESCRIPTION OF THE INVENTION

Figure 1:
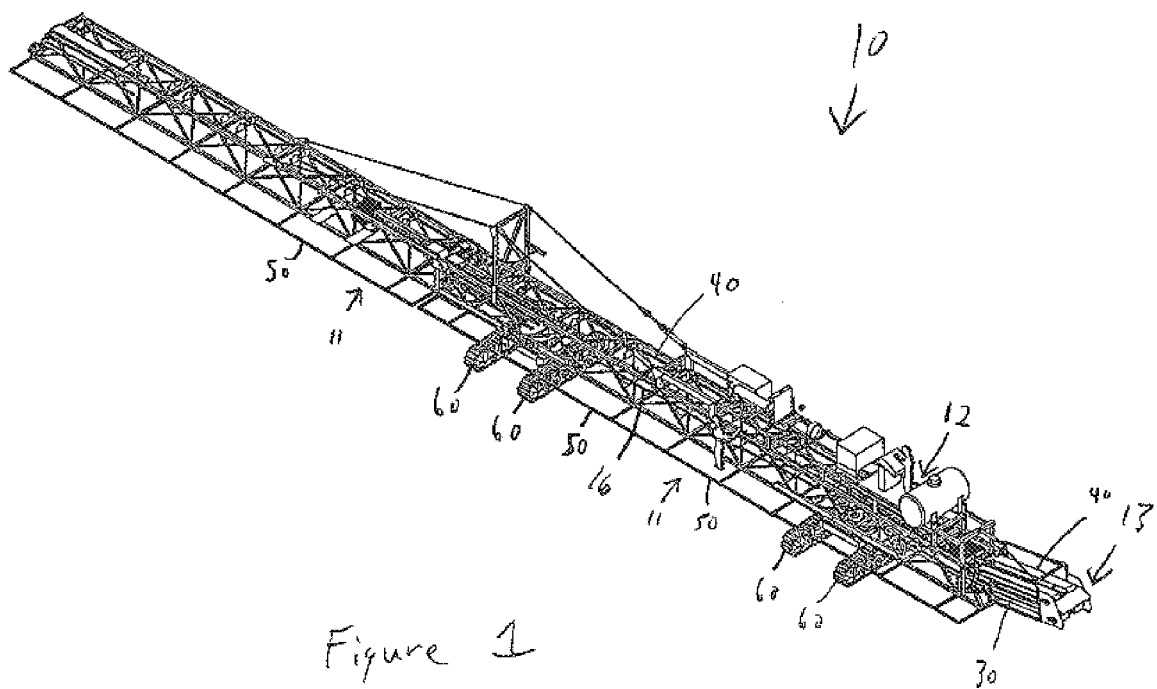
FIG. 1 is a perspective view of a produce harvesting apparatus in accordance with the present invention.
Figure 2:
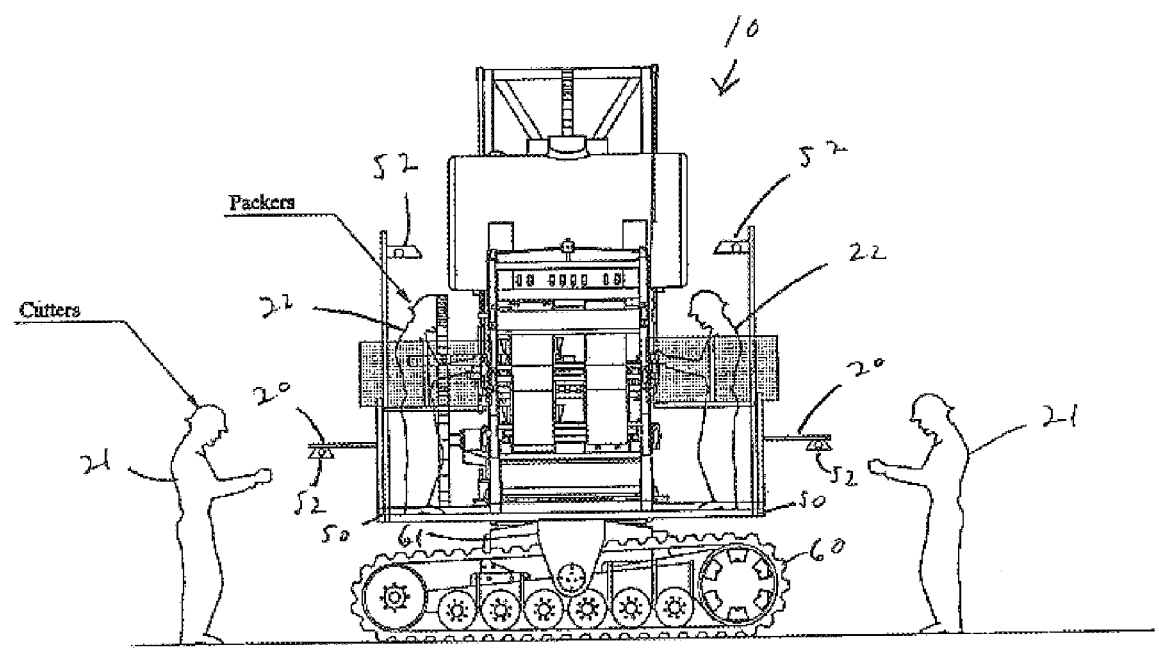
FIG. 2 is an end elevation view of the produce harvesting apparatus illustrated in FIG. 1.
Figures 3, 4:
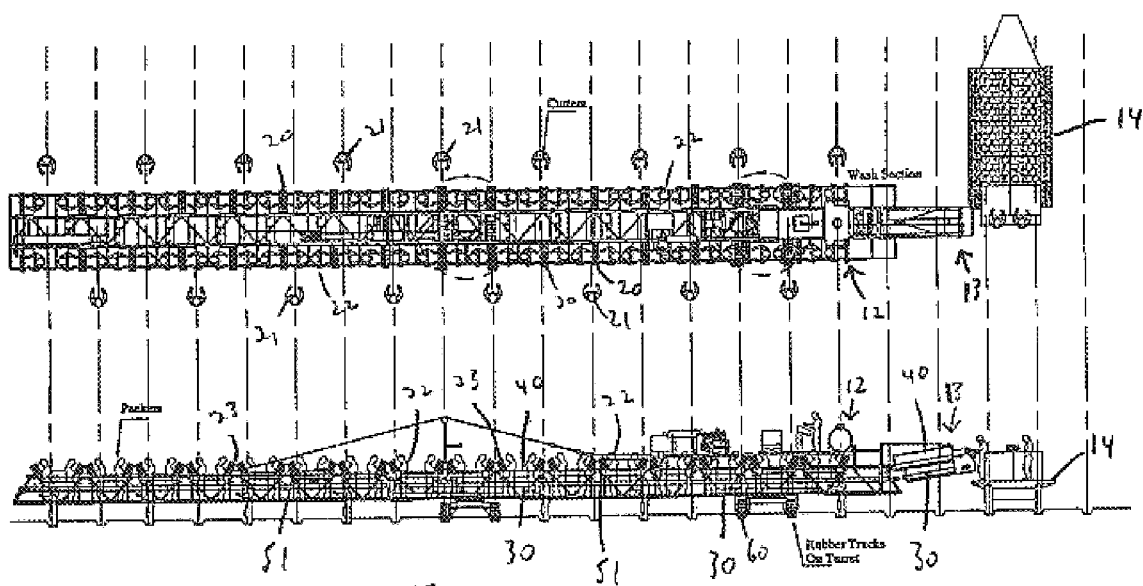
FIG. 3 is a side elevation view of the produce harvesting apparatus illustrated in FIG. 1.
FIG. 4 is a top plan view of the produce harvesting apparatus illustrated in FIG. 1.

FIGS. 1–4 illustrate a produce harvesting apparatus 10. The apparatus is especially useful for harvesting leafy produce such as, for example, romaine lettuce. The apparatus includes at least one trim station 11 and at least one wash station 12. Preferably, there are a plurality of trim stations. Additionally, in a preferred embodiment, a load station 13 is provided for transferring harvested produce to a transport apparatus 14 such as, for example, a truck or trailer. Preferably, the truck or trailer includes a plurality of bins 15 that are lined with polyethylene-based liner bags that receive the harvested produce. A transport device 16, preferably in the form of a conveyor or conveyors, couples the trim station(s) and wash station.

Preferably, each trim station includes a space or platform 20 of some type for receiving harvested produce from a cutter 21. The cutter cuts the produce from the field and preferably trims off waste leaves that are not desirable. The harvested produce is then placed on the platform. A packer 22 then receives the trimmed produce and places it into a container or tote 23 of some type. When the produce is of a type such as, for example, romaine lettuce, one of either the trimmer or packer trims out the core of the head or stalk of produce prior to placing it on the platform or in the container. Thus, as used herein, trimming refers to all types of actions with regard to modifying the harvested produce such as, for example, cutting off portions of the produce, removing a core from the produce, etc.

Once a container is filled with produce, it is preferably left to sit at the trim station while a second container is filled. This allows for sap (latex) to flow from the cut veins in instances when romaine lettuce is being harvested. Once the second container or tote is filled, the first tote is placed on the conveyor. The conveyor then transports the container to the wash station.

Preferably, the wash station includes a plurality of spray nozzles. The nozzles may be arranged in rows or any suitable arrangement that adequately washes the trimmed produce. Thus, preferably, spray nozzles are provided above and below the container so that some spray upwardly while others spray downwardly. Preferably, the transport device within the wash station consists of a conveyor or chain drive such that the totes that sit on the conveyor or chain drive may move through the wash station. Additionally, the wash station may be provided manually and thus, it would involve at least one person manually spraying the produce. Furthermore, the wash station may involve filling the containers with liquid and then dumping them, or may involve submerging the containers in liquid.

Figure 5:
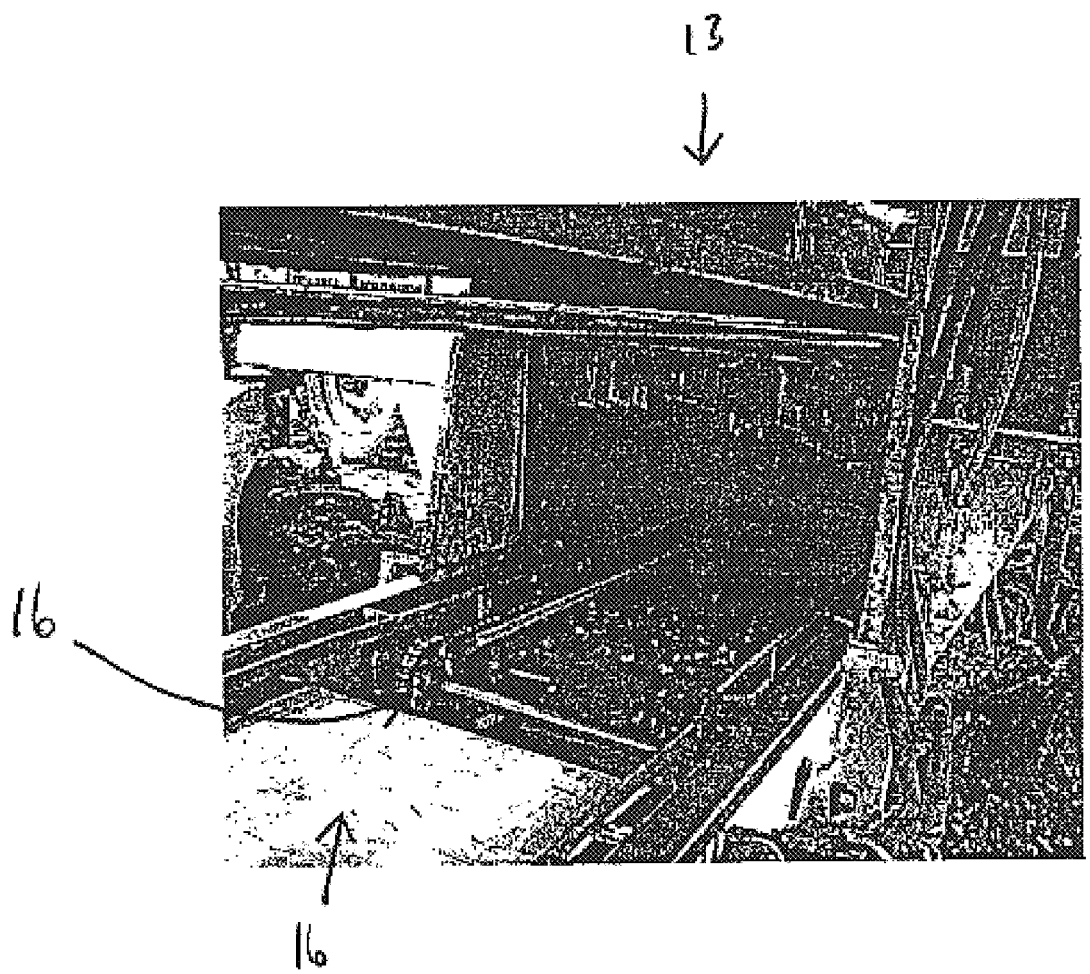
FIG. 5 is a close-up view of a possible wash station for the produce harvesting apparatus illustrated in FIG. 1.
Figure 6:
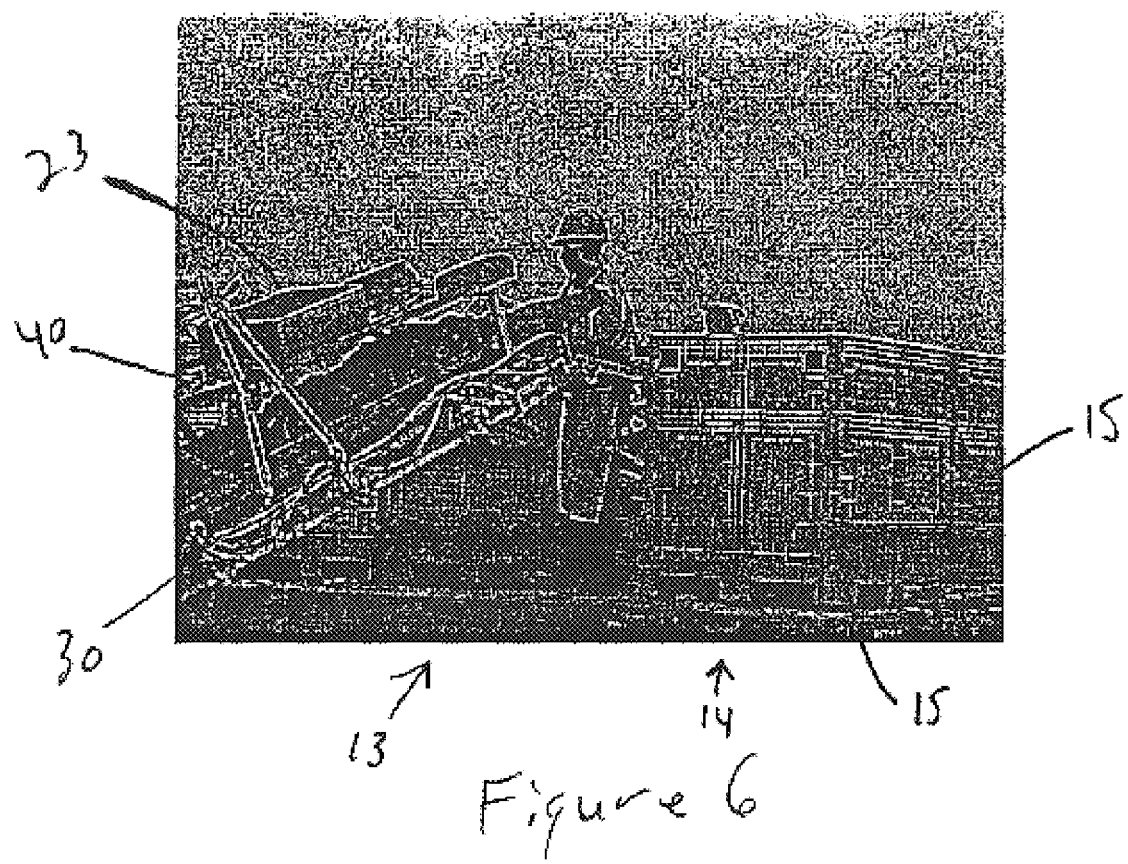
FIG. 6 is a close-up view of a possible load station for the produce harvesting apparatus illustrated in FIG. 1.
Figure 7:
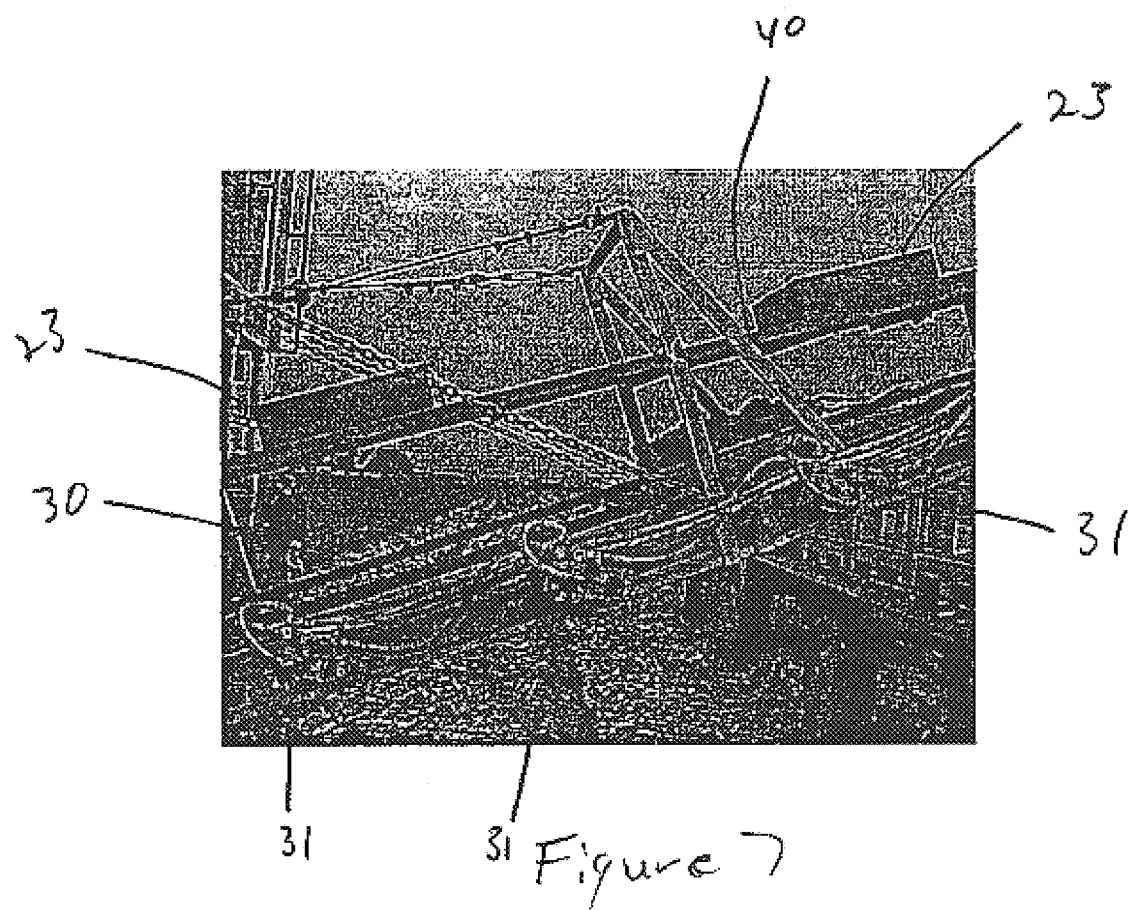
FIG. 7 is a close-up view of part of possible transport devices for the produce harvesting apparatus illustrated in FIG. 1.

With reference to FIGS. 5–7, harvesting apparatus 10 includes a load station 13, a transport device 30, preferably in the form of another conveyor, moves the containers from the wash station to the load station. Transport devices 16 and 30 may be a single conveyor or multiple conveyors. Additionally, a separate transport device may be provided through the wash station, which is illustrated in FIG. 5 with a chain drive. Thus, there may be a single conveyor, multiple conveyors and/or chain drives, in combination if desired, for transporting filled containers through harvesting apparatus 10.

At the load station, at least one person preferably dumps the containers into transport bins that are contained on some sort of transport apparatus 14 such as a truck, trailer, tractor, etc.

In a preferred embodiment, transport device 30 between the wash station and the load station is configured to shake or vibrate, thus shaking or vibrating the containers thereon. This shakes excess water from the totes, and thus from the washed, trimmed produce therein. In one embodiment, a plurality of hydraulic motors 31 are provided in series, which power clapper bars under conveyor 30 in order to bounce the conveyor and thereby the containers. Additionally, transport apparatus 14 may simply include a storage area or bed to directly receive the produce, as opposed to the bins, due to a high volume of containers presented at the load station.

Once the containers have been emptied, a return transport device 40, preferably in the form of a conveyor, is provided for returning empty containers to the trim stations.

In a preferred embodiment, each trim station includes an area 50 on which the packing person stands. Additionally, there are sections 51 for placing the containers while they are being filled and while they are waiting to be placed on the conveyor for transport to the wash station and load station. Additionally, the trim stations preferably include lights 52 so that if it is fairly dark, the cutters and packers may be able to see adequately.

In a preferred embodiment, harvesting apparatus 10 moves on rubber tracks 60 that are coupled to the apparatus with turrets 61, thus allowing the harvesting apparatus to center itself with regard to rows of produce for harvesting in the field. Thus, each rubber track is between rows of produce so that they do not damage any of the produce. Additionally, one set of rubber tracks may pivot vertically and horizontally in order to level the harvesting apparatus.

Preferably, containers 23 comprise some type of tote that allows for liquid to drain through the bottom, as well as sap from the harvested produce. Examples of such containers include a tote with a wire mesh bottom, a basket, a wire basket, a plastic tote with one or more holes in the bottom or a grid-type bottom, and a tote with a solid bottom. If a container is used, the wash station may involve filling the container with a liquid and then dumping out the liquid.

Accordingly, in use, the harvesting apparatus is moved to a field of produce and is positioned so that its rubber tracks are between rows of produce. A motor provided on the harvesting device then starts moving the harvesting apparatus through the field of produce. The cutters are on either side of the harvesting apparatus and cut produce from the field. The cutters preferably trim off waste leaves, core heads from the produce, and cut any other undesired parts from the harvested produce and then place it on the platform at the trim station. The packer then places the trimmed produce into a container. Alternatively, the packer may do some or all of the trimming. Once a first container is filled, the packer begins filling a second container. This allows for sap to exude from the trimmed produce. Once the second container is filled, the first container is placed on the transport device and is transported to the wash station, where the trimmed produce is washed. Obviously, if there is no need or desire for delay, the filled containers may be placed on the conveyor immediately upon being filled.

After the trimmed produce is washed, the containers move along the transport device and are preferably shaken to remove excess water therefrom. Containers are then emptied into either transport bins or directly into a truck or trailer. Emptied containers are then placed on a return transport device so that they are returned to the trim stations.

Although the invention has been described with reference to specific exemplary embodiments, it will appreciated that it is intended to cover all modifications and equivalents within the scope of the appended claims.

What is claimed is:

1. A method of harvesting fresh produce using a produce harvesting apparatus, the method comprising:
   trimming the fresh produce;
   placing the trimmed produce into a container;
   placing the container onto a transport device located on the produce harvesting apparatus;
   transporting the container on the transport device to a wash station; and
   washing the trimmed produce at the wash station.

2. A method in accordance with claim 1 further comprising transporting the trimmed produce on the transport device from the wash station to a transport container and transferring the trimmed produce to the transport container.

3. A method in accordance with claim 2 further comprising shaking the transport device at least between the wash station and the transport container.

4. A method in accordance with claim 3 wherein the transport device comprises a conveyor and the conveyor is shaken by clapper bars located under the conveyor to thereby bounce the conveyor.

5. A method in accordance with claim 3 wherein the transport device is shaken between where the container is placed thereon and the transport container.

6. A method in accordance with claim 1 further comprising placing the container onto a return transport located on the produce harvesting apparatus and transporting the container thereon.

7. A method in accordance with claim 1 wherein the container comprises a tote with a wire mesh bottom.

8. A method in accordance with claim 1 wherein the container comprises a plastic tote with a grid bottom that allows liquid to penetrate through the bottom of the tote after washing the trimmed produce.

9. A method in accordance with claim 1 wherein the container comprises a basket.

10. A method in accordance with claim 1 wherein the container comprises a wire basket.

11. A method in accordance with claim 1 wherein the wash station comprises spray nozzles.

12. A method in accordance with claim 1 comprising submerging the trimmed produce in a liquid at the wash station.

13. A method in accordance with claim 1 wherein the container includes a solid bottom.

14. A method in accordance with claim 13 where the trimmed produce is washed by filling the container with liquid and then dumping or draining out the liquid.

15. A method in accordance with claim 1 further comprising placing trimmed produce in a second container after a first container has been filled with trimmed produce, and then placing the first container on the transport device after the second container is filled.

16. A method of harvesting fresh produce using a produce harvesting apparatus, the method comprising:
   trimming the fresh produce;
   placing the trimmed produce into a container;
   placing the container onto a conveyor located on the produce harvesting apparatus;
   transporting the container on the conveyor to a wash station;
   washing the trimmed produce at the wash station
   transporting the trimmed produce on the conveyor from the wash station to a transport container and transferring the trimmed produce to the transport container
   shaking the container at least between the wash station and the transport container.

17. A method in accordance with claim 16 wherein the shaking is accomplished by clapper bars located under the conveyor that bounce the conveyor and thereby shake the container.

18. A method in accordance with claim 16 wherein the container is shaken between where the container is placed on the conveyor and the transport container.

19. A method in accordance with claim 16 further comprising placing the container onto a return conveyor located on the produce harvesting apparatus and transporting the container thereon.

20. A method in accordance with claim 16 wherein the container comprises a tote with a wire mesh bottom.

21. A method in accordance with claim 16 wherein the container comprises a plastic tote with a grid bottom that allows liquid to penetrate through the bottom of the tote after washing the trimmed produce.

22. A method in accordance with claim 16 wherein the container comprises a basket.

23. A method in accordance with claim 16 wherein the container comprises a wire basket.

24. A method in accordance with claim 16 wherein the wash station comprises spray nozzles.

25. A method in accordance with claim 16 comprising submerging the trimmed produce in a liquid at the wash station.

26. A method in accordance with claim 16 wherein the container includes a solid bottom.

27. A method in accordance with claim 26 wherein the trimmed produce is washed by filling the container with liquid and then dumping or draining out the liquid.

28. A method in accordance with claim 16 further comprising placing trimmed produce in a second container after a first container has been filled with trimmed produce, and then placing the first container on the conveyor after the second container is filled.

29. A portable produce harvesting system comprising:
   at least one trim station for trimming produce;
   at least one container for receiving trimmed produce;
   at least one wash station for washing trimmed produce in the container; and
   at least one transport device coupling the trim station and the wash station.

30. A system in accordance with claim 29 further comprising a load station after the wash station for receiving washed produce, wherein the transport device extends between the trim station and the load station.

31. A system in accordance with claim 30 further comprising means for shaking the transport device at least between the wash station and the load station.

32. A system in accordance with claim 31 wherein the transport device comprises a conveyor and the means for shaking the transport device at least between the wash station and the load station comprise clapper bars under the conveyor.

33. A system in accordance with claim 30 further comprising means for shaking the transport device at least between the trim station and the load station.

34. A system in accordance with claim 33 wherein the transport device comprises a conveyor and the means for shaking the transport device at least between the trim station and the load station comprise clapper bars under the conveyor.

35. A system in accordance with claim 30 further comprising at least one return transport device between the load station and the trim station.

36. A system in accordance with claim 29 wherein the container comprises a tote with a wire mesh bottom.

37. A system in accordance with claim 29 wherein the container comprises a plastic tote with a grid bottom that allows liquid to penetrate through the bottom of the tote after washing the trimmed produce.

38. A system in accordance with claim 29 wherein the container comprises a basket.

39. A system in accordance with claim 29 wherein the container comprises a wire basket.

40. A system in accordance with claim 29 wherein the wash station comprises spray nozzles.

41. A system in accordance with claim 29 wherein the wash station submerges the trimmed produce in a liquid.

42. A system in accordance with claim 29 wherein the container includes a solid bottom.

43. A system in accordance with claim 29 wherein the system comprises a plurality of trim stations.

44. A system in accordance with claim 29 wherein the system comprises a plurality of containers.

45. A portable produce harvesting system comprising:
   a plurality of trim stations for trimming produce;
   a plurality of containers for receiving trimmed produce;
   at least one wash station for washing trimmed produce in the containers;
   a load station after the wash station for receiving washed produce; and
   at least one conveyor coupling the trim stations and the load station.

46. A system in accordance with claim 45 further comprising means for shaking the conveyor at least between the wash station and the load station.

47. A system in accordance with claim 46 wherein the means for shaking the conveyor at least between the wash station and the load station comprise clapper bars under the conveyor.

48. A system in accordance with claim 45 further comprising means for shaking the conveyor at least between the trim stations and the load station.

49. A system in accordance with claim 48 wherein the means for shaking the conveyor at least between the trim stations and the load station comprise clapper bars under the conveyor.

50. A system in accordance with claim 45 further comprising at least one return transport device between the load station and the trim stations.

51. A system in accordance with claim 45 wherein the containers comprise totes with a wire mesh bottom.

52. A system in accordance with claim 45 wherein the containers comprise plastic totes with a grid bottom that allows liquid to penetrate through the bottom of the tote after washing the trimmed produce.

53. A system in accordance with claim 45 wherein the containers comprise baskets.

54. A system in accordance with claim 45 wherein the containers comprise wire baskets.

55. A system in accordance with claim 45 wherein the wash station comprises spray nozzles.

56. A system in accordance with claim 45 wherein the wash station submerges the trimmed produce in a liquid.

57. A system in accordance with claim 45 wherein each container includes a solid bottom.

* * * * *